(12) United States Patent
Piccionelli et al.

(10) Patent No.: US 7,876,353 B2
(45) Date of Patent: Jan. 25, 2011

(54) VIDEO PRODUCTION WITH SELECTABLE CAMERA ANGLES

(76) Inventors: Gregory A. Piccionelli, 30801 Calaise Ct., Westlake Village, CA (US) 91362; Patrick C Collins, 8015 Deering Ave., Canoga Park, CA (US) 91304

( * ) Notice: Subject to any disclaimer, the term of this patent is extended or adjusted under 35 U.S.C. 154(b) by 1445 days.

(21) Appl. No.: 11/516,249

(22) Filed: Oct. 28, 2005

(65) Prior Publication Data
US 2007/0070209 A1   Mar. 29, 2007

Related U.S. Application Data

(63) Continuation-in-part of application No. 10/822,212, filed on Apr. 9, 2004.

(60) Provisional application No. 60/462,244, filed on Apr. 11, 2003.

(51) Int. Cl.
*H04N 5/30* (2006.01)
*H04N 7/18* (2006.01)

(52) U.S. Cl. .................. 348/159; 348/131

(58) Field of Classification Search ............ 378/57; 348/14.02, 14.01, 14.11, 14.12, 159, 122, 348/143, 144, 149; 725/105
See application file for complete search history.

(56) References Cited

U.S. PATENT DOCUMENTS

| | | | |
|---|---|---|---|
| 4,631,676 A * | 12/1986 | Pugh | 600/595 |
| 5,764,276 A | 6/1998 | Martin et al. | |
| 5,793,414 A | 8/1998 | Shaffer | |
| 6,139,433 A * | 10/2000 | Miyamoto et al. | 463/32 |
| 6,650,360 B1 * | 11/2003 | Osen | 348/157 |
| 6,675,386 B1 | 1/2004 | Hendricks et al. | |
| 6,842,583 B1 * | 1/2005 | Weber et al. | 396/3 |
| 7,432,949 B2 * | 10/2008 | Remy et al. | 348/14.02 |
| 7,534,056 B2 * | 5/2009 | Cross et al. | 396/427 |
| 2003/0020824 A1 * | 1/2003 | Ito et al. | 348/345 |
| 2004/0010804 A1 | 1/2004 | Hendricks et al. | |
| 2005/0052527 A1 * | 3/2005 | Remy et al. | 348/14.08 |
| 2005/0122488 A1 * | 6/2005 | Fernandez | 353/120 |

* cited by examiner

*Primary Examiner*—Jerome Grant, II

(57) ABSTRACT

An apparatus for viewing an event at an event site includes a plurality of cameras disposed about an event site, the cameras providing views of the event site from at least two different camera angles, and a viewer in communication with the plurality of cameras, the viewer enabling a user to selectively view the event by means of at least two of the plurality of cameras.

33 Claims, 4 Drawing Sheets ized within the support structure can include, for single structure, a soundproofed room, or single structure to which all of the cameras are affixed, or any # VIDEO PRODUCTION WITH SELECTABLE CAMERA ANGLES This application is a continuation-in-part of U.S. patent application Ser. No. 10/822,212, filed Apr. 9, 2004, which in turn is based on Provisional U.S. Patent Application Ser. No. 60/462,244, filed Apr. 11, 2003, the entire disclosures of which are incorporated herein by reference.

FIELD OF THE INVENTION

The present invention relates to a system and method of viewing an event via a network, such as the Internet, and to a system and method for recording the event so viewed. More particularly, the present invention relates to a system and method of producing a video recording in which an on-line user is enabled to selectably vary the camera angle used in producing the video recording.

BACKGROUND OF THE INVENTION

Systems and methods that provide views of an event, such as a football game or other sporting event, a musical or dramatic performance, and the like, from multiple selectable angles are known. Typically, such systems include a plurality of cameras located at different sites around the playing field, stage, etc. Feeds from each camera are provided to a control room, and a production crew selects a sequence of feeds for broadcast to viewers.

Viewers of the events, however, must rely on the producers' selection of feeds. Some viewers may desire to view the event from an angle not selected by the producers. Presently known systems do not provide for an interactive viewing experience. In particular, presently known systems do not enable a viewer to select a desired sequence of camera angles and record them, more particularly to record them via a network such as the Internet.

Furthermore, presently known systems employ a large number of producers, directors, cameramen, grips and other technical personnel. The costs associated with such systems render broadcasting of events or productions to other than mass audiences prohibitively expensive.

A need exists for a system and method for viewing an event from a plurality of selectable camera angles.

A need also exists for a system and method of viewing an event over a network such as the Internet, and for recording the event so viewed.

SUMMARY OF THE PREFERRED EMBODIMENTS

In accordance with one aspect of the present invention, there is provided an apparatus for viewing of an event at an event site. The apparatus includes a plurality of cameras disposed about an event site, which provide views of the event site from at least two different camera angles, and a viewer in communication with the plurality of cameras. The viewer enables a user to selectively view the event by means of at least two of the plurality of cameras.

According to more particular embodiments of the inventive apparatus, there is provided a separate support structure for the plurality of cameras. The support structure, in certain embodiments, is a collapsible structure. Such structures include, for example, portable inflatable structures, and collapsible frameworks including a plurality of spars. In very specific embodiments, two or more collapsible frameworks can be assembled together to define an at least partially enclosed volume within which the event site is located.

According to other more particular embodiments of the inventive apparatus, a support structure for the plurality of cameras is secured within some other larger structure. Thus, in one specific embodiment, the support structure (which can be, for example, a set of separate camera mounts, a single structure to which all of the cameras are affixed, or any combination thereof) is secured to at least a portion of an interior volume of a vehicle, within which the event site is located. In another specific embodiment, the support structure is secured to at least a portion of an interior volume of a building, such as a sound stage, a soundproofed room, or some other at least partially enclosed space. For example, the support structure can be secured to a wall, a ceiling, a floor or some other portion of a room within which the event site is located.

In addition to providing cameras, additional embodiments of the inventive apparatus further provide a lighting system. The lighting system in such embodiments can include, for example, a single light, or a plurality of lights. If a plurality of lights are provided, they can be provided separately or as part of an integrated lighting system, e.g., secured to a framework. The lights can be secured to a support structure at various locations.

Specific embodiments of the inventive apparatus can readily be utilized by individuals, particularly non-professional film or video producers, at a home or other location. To assist in the use of such embodiments, additional embodiments of the inventive apparatus provide with the support structure a plurality of indicia for facilitating attachment of the plurality of cameras and/or a lighting system to the support structure.

According to additional particular embodiments, the plurality of cameras includes cameras having different focuses, such as close-up, medium-range, wide-angle, and the like.

For certain purposes it may prove beneficial to alert a participant in an event when he or she is not visible to one or more of the plurality of cameras, or to provide the participant with visual or auditory information. This is particularly beneficial when the event is a performance, such as a musical, theatrical, comedic or dramatic performance. Thus, according to further specific embodiments, the inventive apparatus further includes an obscured-participant signal, which alerts a participant in an event at the event site when the participant is not visible to at least one of the plurality of cameras. According to still other specific embodiments, the inventive apparatus further includes a participant communication system which provides visual or auditory information (e.g., directions) to a participant in the event. In yet more specific embodiments, the participant communication system enables the user to provide visual or auditory information to the participant in the event.

In certain applications of the inventive apparatus, an event to be viewed takes place in a location at some distance from the user who views the event. Thus, in additional specific embodiments of the inventive apparatus, the viewer enables the user to view the event site from a viewing location remote from, or not visible from, the event site.

In accordance with another aspect of the present invention, there is provided a system for viewing an event at an event site. The inventive system includes a central site, and an apparatus including: a plurality of cameras disposed about an event site, the cameras providing views of the event site from at least two different camera angles, the cameras providing feeds to the central site; and a viewer enabling a user to access the central site and to selectively view the event by means of at least two of the plurality of cameras.

The central site can be, for example, a control unit for the apparatus, or a server or other dedicated processing device which is connected to a network in more specific embodiments. According to particular embodiments in which the central site is connected to a network, the cameras provide the feeds to the central site via the network.

Specific embodiments of the inventive system include a support structure for the plurality of cameras, lighting systems, and/or indicia as described above. Further specific embodiments of the inventive systems include cameras having different focuses as described above. Additional specific embodiments further include an obscured-participant signal that alerts a participant in an event at the event site when the participant is not visible to at least one of the plurality of cameras, and/or a participant communication system that provides visual or auditory information to a participant in an event at the event site (and more specifically visual or auditory information from a user viewing the event), also as described above.

Yet other particular embodiments of the inventive system include a viewer that enable the user to view the event site from a viewing location remote, or not visible, from the event site.

Additional specific embodiments of the inventive system can be connected to recorders that enable selective recording of the feeds from at least two of the plurality of cameras, and very specifically recorders that are operable by the user.

In accordance with still another aspect of the present invention, there is provided a method of viewing an event at an event site. The method includes the steps of: providing an apparatus for viewing the event at the event site, the apparatus including a plurality of cameras disposed about the event site, the cameras providing views of the event site from at least two different camera angles, and a viewer in communication with the plurality of cameras, the viewer enabling a user to selectively view the event by means of at least two of the plurality of cameras; and viewing the event using the viewer.

A wide range of events, at many different event sites, can be viewed according to methods of the present invention. Thus, in particular embodiments, the event site is a stadium, a theater, an auditorium, a governmental building or a religious edifice such as a church, temple or the like. In other particular embodiments, the event site is a commercial establishment, an entertainment production facility (such as a facility for the production of a movie or a video), a residence or an interior of a vehicle. Portions thereof (e.g., a room in a residence, a sound stage within a movie studio, etc.) are included within the foregoing, non-limiting exemplary event sites.

As described previously, the apparatus employed according to various more particular embodiments of the inventive method includes a support structure for the plurality of cameras. Thus, in some specific embodiments, the support structure is a collapsible structure. When the support structure is, for example, an inflatable structure which defines an at least partially enclosed volume, the event site is typically located within the inflatable structure. When the support structure comprises a collapsible framework, in certain specific embodiments collapsible framework is provided adjacent the event site, while in other specific embodiments a plurality of collapsible frameworks are provided which collectively define an at least partially enclosed volume, and the event site is located within the at least partially enclosed volume defined thereby.

Certain specific embodiments of the inventive method are adaptable to viewing moving or movable events, or events which occur in exotic locations. Thus, according to such specific embodiments of the inventive method, the apparatus is provided in a portable form. The portable form is a collapsible structure in some particular embodiments, as described above. Alternatively, the apparatus is incorporated into at least a portion of an interior volume of a vehicle.

Other specific embodiments of the inventive method are adaptable to viewing events taking place at fixed event sites, such as stadiums, theaters, movie or video production facilities, and the like. In such embodiments, the apparatus is typically secured to the event site.

As described previously, apparatus useful in practicing various particular embodiments of the inventive method can make use of cameras having different focuses, such as close-up, medium-range and/or wide-angle. Similarly, useful apparatus can further include a lighting system. Indicia for facilitating attachment of the plurality of cameras and/or the lighting system to the support structure are provided according to still other particular embodiments, and the plurality of cameras and/or the lighting system are attached to the support structure in accordance with the indicia. Further particular embodiments of the inventive method include in the apparatus include an obscured-participant signal that alerts a participant in the event at the event site when the participant is not visible to at least one of the plurality of cameras.

Additional inventive methods according to embodiments of the present invention include the step of providing visual or auditory information to a participant in an event at the event site. More particular embodiments include the step of providing an instruction to at least one participant in the event at the event site. Such events can include, without limitation, a performance (in which case the instruction can be a direction to a performer in the performance, or a request from a viewer for the performer to perform a specific song, tell a specific story, etc.), a sporting event (in which case the instruction can be a particular play to be carried out by a player or team), a contest at a bar or nightclub (in which case the instruction can be a challenge from a viewer), and the like. The instruction is provided from a site remote, or not visible from, the event site in specific embodiments. According to alternative particular embodiments, at least one audio recording is provided to the event site during the event.

Further specific embodiments include the additional step of providing at least one item, such as a theatrical prop, for use at the event site by a participant in the event.

According to other particular embodiments of the inventive method, the is viewed over a network to which the apparatus is connected; more particularly, the is connected to a central site over a network, and a user views the event over the network.

The foregoing method affords numerous opportunities for generation of revenue. Thus in specific embodiments, a premium is charged for use of the apparatus; for conveyance of the apparatus to a user; for use of the apparatus when secured at an event site; for provision of one or more one audio recording; and for viewing of the event.

In addition to simply enabling viewing of an event, additional methods according to the present invention facilitate producing recordings of the event. Thus, in accordance with an additional aspect of the present invention, there is provided a method for producing a recording of an event at an event site. The method includes the steps of: providing an apparatus for recording the event at the event site, the apparatus including a plurality of cameras disposed about the event site, the cameras providing feeds of the event site from at least two different camera angles, and a recorder in communication with the plurality of cameras, the recorder enabling a user to selectively record the event by means of at least two of the plurality of cameras; and selectively recording the feeds from the at least two of the plurality of cameras.

A more particular embodiment of the inventive method employs an apparatus that also includes a viewer in communication with the plurality of cameras. The viewer enables a user to selectively view the event by means of at least two of the plurality of cameras. Additional particular embodiments employ an apparatus having one or more of the additional features previously described in the context of the preceding aspects of the invention, i.e., support structures, lighting systems, etc.

Further embodiments of the inventive method provide for the recording of two or more events, each at a different event site provided with a separate apparatus, and additionally for producing a recording that at least partially combines the separate recordings of the individual events into a single whole, for example to simulate the occurrence of two or more events at the same event site.

Recordings can be produced according to embodiments of the inventive method by a participant in the event being recorded, or in the alternative by a recording producer who is not a participant in the event. Once the recording is produced, a copy of the recording is provided to at least one event participant according to particular embodiments, more specifically upon payment of a premium. In additional embodiments, the original recording is retained by the recording producer, or alternatively by one or more of the event participants.

It may be desirable to prevent unauthorized viewers from viewing a recording of a particular event. Thus, according to additional particular embodiments of the inventive method, a copy of the recording is provided to an event participant in encrypted form. More particularly, a decryption device is provided together with the encrypted copy of the recording, and the copy is viewable only by use of the decryption device. A decryption key is also provided, according to very particular embodiments, while in other embodiments, the decryption key is modifiable by the recording producer and provided to the event participant when modified, in order to provide heightened security against unauthorized viewing.

Recording can be carried out over a network to which the apparatus is connected, in certain specific embodiments; more specifically, the apparatus is connected to a central site over a network, and a user records the event over the network by accessing the central site.

Revenue can be generated according to the inventive method in manners similar to those set forth previously, and in addition, a user can be charged a premium prior to recording an event over a network in particular embodiments.

In accordance with still another aspect of the present invention, a recording produced by a method described above is provided.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the drawings, like elements are numbered alike throughout.

DETAILED DESCRIPTION OF THE PREFERRED EMBODIMENTS

Figure 1:
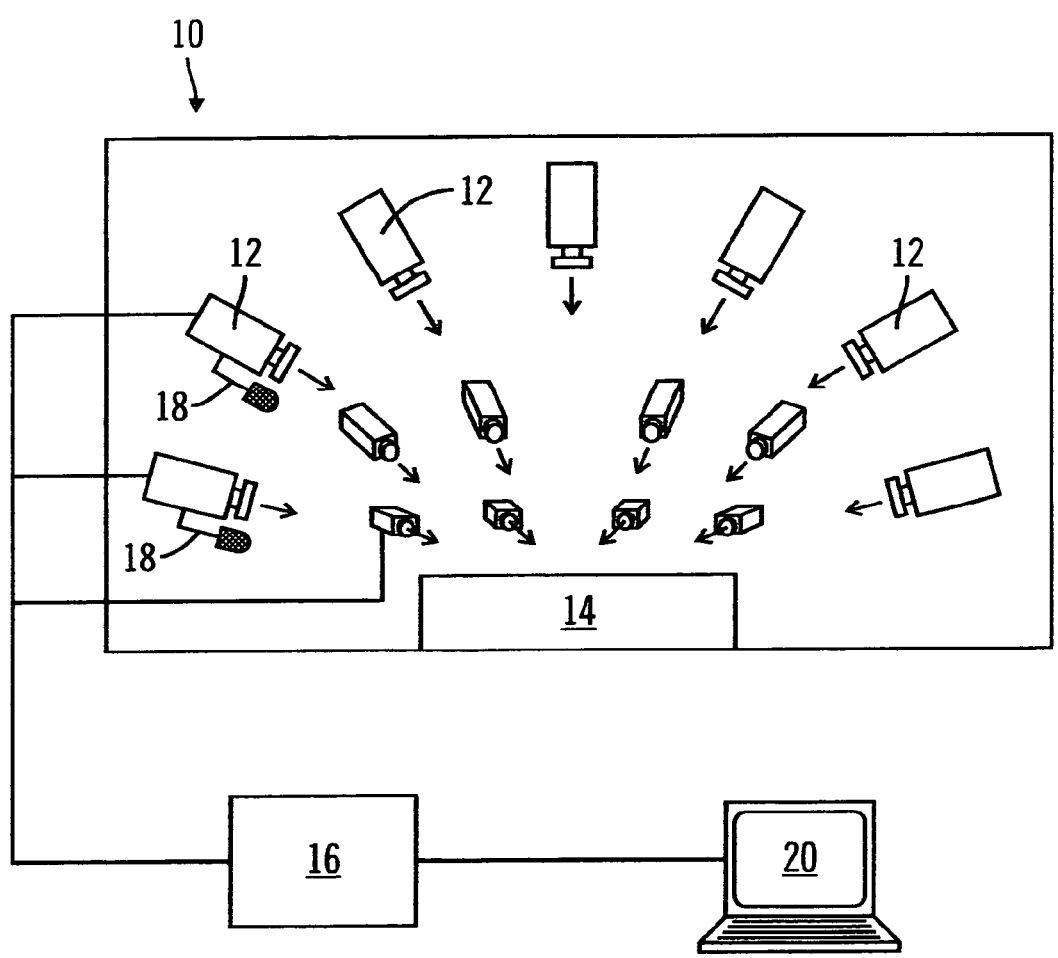
FIG. 1 is a schematic of a system according to an exemplary particular embodiment of the invention including a plurality of cameras disposed in a room about an event site, the cameras being connected to a central site via a network and providing video feeds to the central site.

As used herein, the term "event" denotes any activity which is carried out by at least one participant and which a user desires to view and/or record. Participants can be human beings, animals, plants, or even objects (such as flowing rivers, seascapes, etc.) Non-limiting examples of events which can be subjects of embodiments of the present invention include sporting events, political events such as speeches and rallies, concerts, plays, and theatrical, comedic or dramatic performances. More particular events which can be subjects of embodiments of the present invention include performances for films or videos, including music videos, as well as live performances suitable for general audiences and live performances of an adult nature.

An "event site" is any location in which an event takes place. Non-limiting examples of event sites include sports stadiums, auditoriums, government office buildings, religious edifices such as churches, theaters, movie production facilities, commercial establishments such as bars and nightclubs, private homes, hotel rooms, portable structures, and vehicles including motor homes, box trucks, trailers, aircraft, and boats. Event sites need not be within structures or vehicles, however, but can also be located in an outdoor or natural setting, such as a field, a riverbank, a natural cavern, and the like.

Viewing and/or recording of events according to methods of the invention can take place in a location that is not visible from the event site. For example, the event can take place in a soundproof room in a movie studio, or in a commercial establishment such as a bar or nightclub, while viewing can take place in another room in the same structure, such as a control room or a dining or dancing area of a nightclub. Viewing and/or recording can also take place in a location that is not a part of the same structure in which the event site is located, or in a structure from which the event site is not directly accessible when the event site is not within a structure or vehicle. Such viewing locations are referred to as "remote from the event site" herein.

As used herein, a "viewer" is a device or a combinations of one or more devices, together with appropriate software, connecting devices or elements and/or controlling devices such as servers, that receives input from a camera or other image transmission device and produces a visual image or series of visual images for a user. Non-limiting examples of viewers include computer monitors, video phones, television sets, and the like.

As used herein, a "recorder" is a device or a combination of one or more devices, together with appropriate software, connecting devices or elements and/or controlling devices such as servers, that receives an input from a camera, a viewing system as described herein, or other sound and/or image transmission device and produces a recording of the image so received. The recording can be in any desired medium, including, without limitation, a tape, a computer disk such as a floppy disk, a CD-ROM or a DVD, a film, etc.

Referring now to FIG. 1, a system 10 according to an embodiment of the invention includes an apparatus 11. Apparatus 11 includes a plurality of cameras 12 surrounding an event site 14 at which an event which is to be recorded takes place, as shown a set within a room of a larger structure such as a residence, a movie production facility or a commercial establishment. Lighting system 13, as shown a plurality of lights 15, provides lighting to facilitate viewing and/or recording of the event. Each camera 12 provides a video feed to a central site 16 which is accessible via a network such as the Internet.

In particular embodiments, each of the plurality of cameras 12 records the event taking place at event site 14 from a different angle. Two or more of the cameras 12 can have different focuses as well. For example, one camera can have a wide-angle focus, another a medium-range focus, and another a close-up focus. Cameras 12 can be distributed about event site 14 in any desired pattern. The configuration of the event site 14 will in certain embodiments constrain the distribution of cameras 12 for optimal coverage. For example, event site 14 in certain embodiments is a set within a sound stage at a film studio at which a performance takes place. Cameras 12 in such embodiments can be distributed in a regular hemispherical configuration, with each camera's field of vision overlapping to an equal degree such that the entire hemisphere is covered. If desired, a lesser number of cameras 12 can be employed, such that less than the entire hemisphere is covered but such that multiple camera angles are afforded. In such embodiments, the distribution of cameras 12 can be varied to emphasize desired ranges of camera angle. Alternatively, the cameras 12 can be distributed such that the field of vision of two or more cameras overlap to a greater degree than the remaining cameras.

In other embodiments, event site 14 is a stadium or other venue at which a sporting event, concert, political rally or other event takes place. Cameras 12 in such embodiments can be distributed around the periphery of the stadium or other venue, such that the event is visible from a desired range of camera angles. In more specific embodiments, cameras 12 are distributed about the entire periphery of the stadium or other venue, affording an approximately 360° view of the event. In still other embodiments, one or more cameras 12 can also be disposed at points within the stadium, for example along one or more sidelines of a football stadium, one or more baselines of a baseball stadium, adjacent a stage located within the stadium, etc. In additional embodiments, cameras 12 can be disposed at a plurality of locations along a parade route, highway, coastline or other extended geographic location.

In still other particular embodiments, cameras 12 are distributed at a plurality of locations on the outer surface of an aircraft, motor vehicle, naval vessel or other form of transportation. Such embodiments afford a range of landscapes, seascapes and/or aerial views observable during the course of travel by the aircraft or other form of transportation.

Cameras 12 in further particular embodiments can be accompanied by audio pickups 18, in order to provide sounds as well as images from each camera location. A user accesses central site 16 via a network, and uses a viewer 20 to view the event via at least two of the cameras 12, such as a personal computer, PDA or other device that is capable of connecting to the network.

Figure 2:
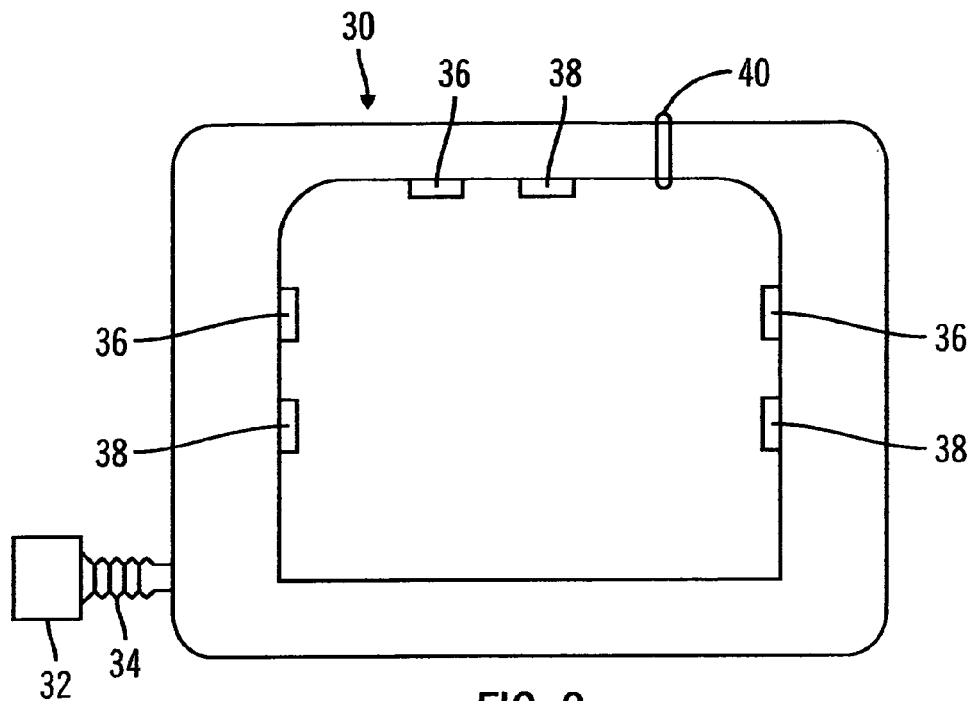
FIG. 2 is an illustration of an inflatable structure within which a plurality of cameras and a lighting system are installed according to another particular embodiment of the invention.

As shown in FIG. 1, the inventive apparatus is secured to a portion of an interior volume of a building, namely a room configured for the purpose of recording the event. According to the embodiment illustrated in FIG. 2, an inflatable structure 30 is provided for viewing and/or recording of an event to take place within the inflatable structure. Using a compressor 32 connected to inflatable structure 30 via a conduit 34, the inflatable structure is inflated to its full size. Within inflatable structure 30 are camera mounts 36 and lighting mounts 38, to which cameras 12 and lights 15 are secured. Depending on the quantity of heat generated by cameras 12 and/or lights 15, mounts 36 and 38 may require insulation to prevent damage to the inflatable structure 30. Ventilation system 40 provides an escape route for excess heat generated during the event.

Figure 3:
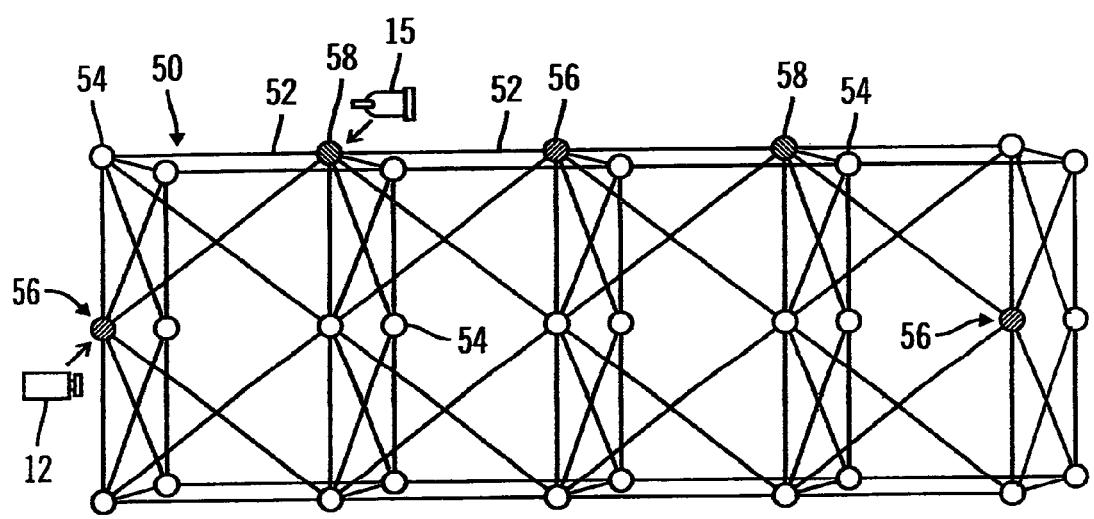
FIG. 3 is an illustration of a collapsible framework including a plurality of spars, which further includes indicia to facilitate attachment of cameras and lights.

FIG. 3 illustrates a collapsible framework 50 which is useful in alternative embodiments of the invention. Framework 50 includes a plurality of spars 52 and connecting elements 54 which slidingly and lockingly engage with spars 52 to permit expansion and contraction of the framework 50. Cameras 12 and lights 15 can be secured to framework 50 at various desired locations. Indicia 56 and 58 guide a user in assembling the apparatus and placing the cameras and lights, respectively, in the proper manner. The indicia 56 and 58 can be, for example, color-coded symbols, printed instructions, arrows, or the like, and can be placed at any desired location on the framework (as shown, on connecting elements 54). Covering elements (not shown) can also be applied, if desired, to framework 50 to prevent onlookers from viewing the event site through the framework.

Framework 50 can be used alone, and erected adjacent to an event site to be viewed and/or recorded. Alternatively, two or more frameworks 50 can be erected to collectively define an at least partially enclosed volume. The volume so defined can be covered by a protective element such as a covering sheet in order to protect the event site from observation from above, or from the elements when the event is to occur outdoors.

Figure 4:
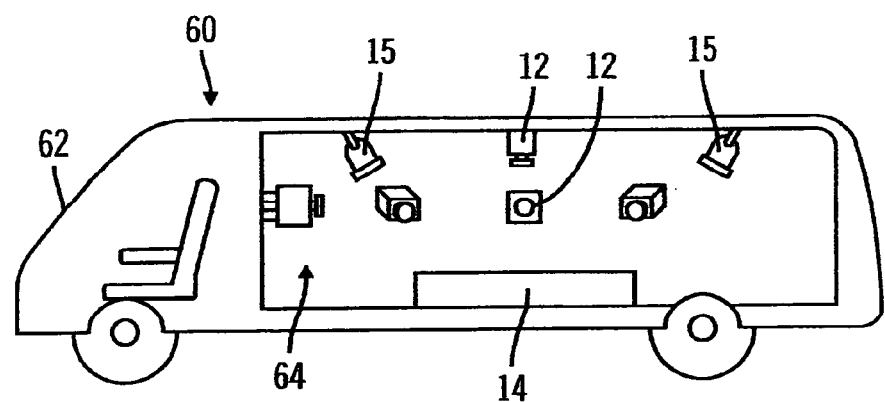
FIG. 4 is a sectional illustration of a vehicle having an interior volume within which another embodiment of an apparatus of the invention is installed.

Turning to FIG. 4, a mobile embodiment 60 of an apparatus according to the invention includes cameras 12 and lights 15 secured within the interior 64 of a vehicle 62. Event site 14 is also located within interior 64 of vehicle 62. Vehicle 62 can be any type of vehicle, whether self-propelled or not. Non-limiting examples include cars, trucks, vans, mobile homes, SUVs, trailers, boats, railroad cars and aircraft.

Figure 5:
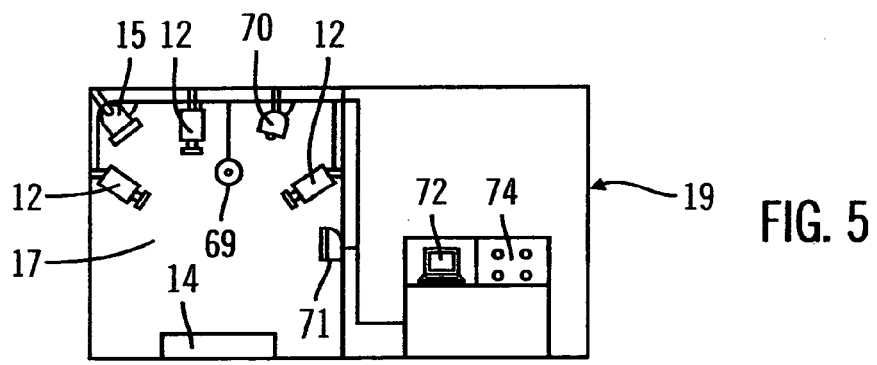
FIG. 5 is an illustration of an apparatus according to another embodiment of the invention installed within a room containing an event site, adjacent which is a central site from which viewing and recording can be carried out according to the invention.
Figure 6:
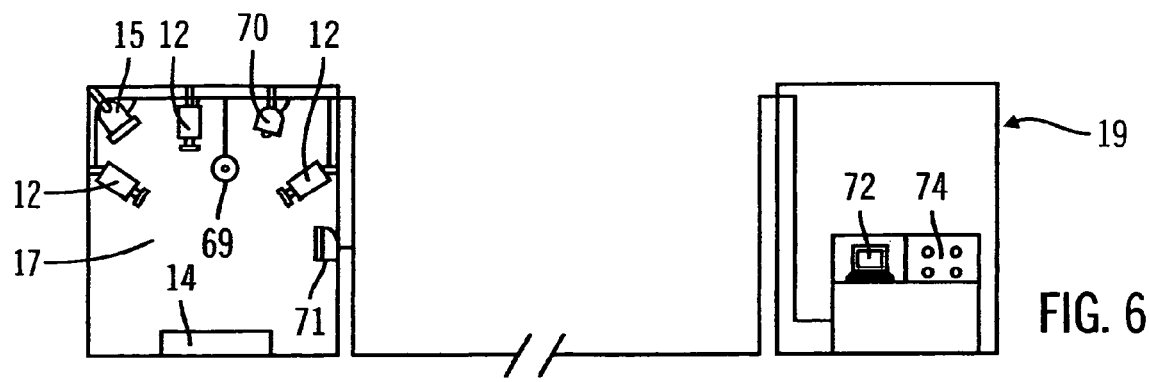
FIG. 6 is an illustration of an apparatus according to a further embodiment of the invention installed within a room containing an event site, which is connected to a central site which is remote from the event site and from which viewing and recording can be carried out according to the invention.

FIGS. 5 and 6 illustrate systems for viewing and/or recording an event at an event site 14 from a location that is not visible from the event site (FIG. 5) or that is remote from the event site (FIG. 6), respectively. In FIG. 5, event site 14 is located within a room 17 in a building, such as a movie studio, and an apparatus according to the invention, including a plurality of cameras 12, lighting system 15, an obscured-participant signal 69 (for example, an alarm) which alerts an event participant when the participant is not visible to at least one of the plurality of cameras, and a participant communication system including, for example, speaker 70 by which audio information is provided to an event participant, is secured within the room. The participant communication system, in additional embodiments, includes devices such as a video monitor 71 for providing visual information to an event participant. In another room 19, here located adjacent event site 14, are located viewer 72 for viewing the event, as illustrated a computer monitor, and recorder 74, such as a DVD burner, for recording the event. In FIG. 6, room 19 is located in a physical location separated from the structure containing the event site, for example, in another city or state, and is in communication with the apparatus secured within room 17, for example via a network.

Figure 7:
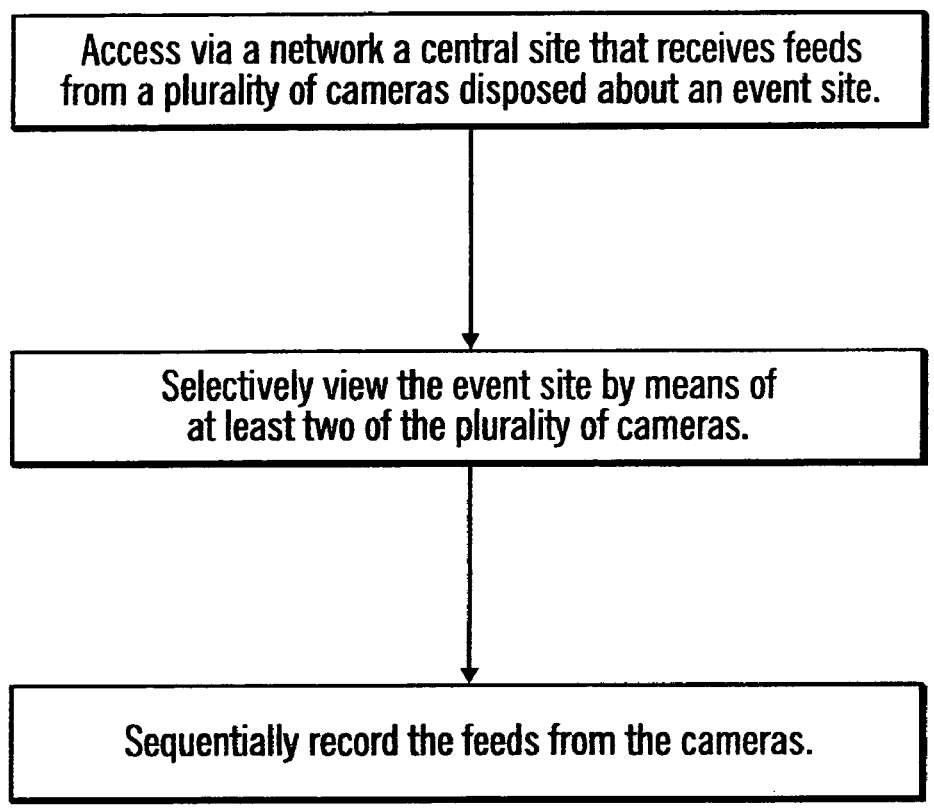
FIG. 7 is a flowchart illustrating a recording method according to the invention.

FIG. 7 illustrates an embodiment of a method of on-line video production according to the invention. Central site 16 receives feeds from the cameras 12 and makes the feeds available to a user for viewing using a viewer. A user accesses central site 16 via a network, such as the Internet. In particular embodiments, the user subscribes to a service provided by the central site. In other particular embodiments, the user provides payment to the central site on a per-use basis, using a credit card or other conventional forms of payment.

Once the user accesses the central site, the user is afforded a selection of views of the event site. In particular embodiments, the user specifies one of the plurality of cameras 12 for viewing the event site 14, and then is enabled to sequentially or randomly access each of the other cameras 12. The user is thus enabled to view the event site 14 from one, some or all of the camera angles provided by the cameras 12. This allows the user to navigate around the event site 14 and view the events taking place therein from any desired camera angle(s).

Various means can be employed to enable the user to navigate around the event site 14. In particular embodiments, the user is provided with a menu listing all available cameras 12. By clicking on the desired camera, the user views the event site from the desired camera angle. In other embodiments, the menu can include a sequential cycling choice. Selection of this option provides a view of the event site from each camera angle in turn. Still other embodiments can include a random selection option. This option provides a sequence of views from randomly selected cameras.

Still other embodiments enable the user to access desired camera views by means of a joystick. Other control means, such as heads-up displays, can also be used to specify the particular view or views which the user desires to see.

The plurality of cameras 12 provide multiple camera angles from which to view the event site 14. Shifting from one camera to another provides a discrete change of camera angle. In specific embodiments, a continuous change of camera angle is provided. Such embodiments employ a processor to generate a smooth transitional view between two cameras.

More particular embodiments of the inventive method afford the user the option of recording the events as viewed. In specific embodiments, the user is provided with a menu option requesting that all selected and/or generated views of the event site be recorded using a recorder. Such a recording can be prepared by the central site as a digital file which the user can subsequently download to a recorder, or alternatively can be recorded at the central site on a computer disk, video tape, CD-ROM, DVD, or any other desired storage medium and later provided to the user.

After recording the event as viewed, additional particular embodiments of the inventive method afford the user the option of editing the recording prior to downloading or transfer to a disk or other storage medium. For example, the user can be provided with the option of deleting one or more scenes as recorded by a particular camera 12; removing a selected segment of the recording; adding special effects to a selected segment, such as graphic overlays, sound effects, coloration, etc., enlarging one or more segments of the recording, thus simulating a close-up, and the like.

In addition to preparing a recording of the event as viewed, alternative embodiments of the inventive method record the entirety of each camera's feed and select a desired sequence of recorded feeds from those so recorded after completion of the event.

The inventive methods afford numerous opportunities for generation of revenue. Premiums can be charged for the use or purchase of the various apparatus and systems, as well as for any recordings made of the events. Premiums can also be charged for viewing the events. Such premiums can be in the form of cash payments, charges to credit accounts, agreements to acquire membership in an organization, or any other valuable consideration.

The apparatus, systems and methods according to embodiments of the present invention can be employed in a number of applications. An exemplary application is the production of video recordings. Apparatus and systems can be packaged and sold or rented to individuals for home use in recording, for example, children's birthday parties or other social events. A recording of a child can be produced periodically and assembled to create a depiction of the child's growth over time. In particular, digital processing can be used to interpolate between recorded images to create the appearance of continuous growth, as well as permit viewing of the child from multiple angles during the process.

Another application pertains to the production of video recordings of an adult nature. Certain individuals may desire to perform in adult videos, either for personal use or professionally, but may be reluctant to do so under ordinary circumstances, i.e., in the presence of the director, producer, film crew, etc. Such reluctance may not be allayed by filming on a closed set. According to the present invention, however, individuals are enabled to perform in a closed room, such as a bedroom in a residence, without the physical presence of any other observers. Multiple views of the performance are obtained from various angles and from different focuses, and the views so obtained are combined, either in real time or at a later time, into a complete recording of the performance. The performers receive directions from a director at another location, such as another room in the residence or in the movie production facility, or in a remote location such as another state, via a network connection as described herein. Other visual and/or auditory information, such as music, video displays or the like, are also provided as desired by the event participant(s) and/or the recording producer. "Synch license" fees for the use of copyrighted materials are charged when required.

Adult videos as discussed above are particularly suitable for production according to methods of the invention which include an encryption step. The recordings so produced according to such methods are encrypted according to a desired encryption algorithm. Encryption can be performed automatically as each camera's feed is recorded, after assembly of the completed recording, or at any intermediate point as desired. Once encrypted, only those viewers who possess a decryption key are able to view the recording. To facilitate viewing by authorized persons, a decryption device can also be provided together with the encrypted copy of the recording. The decryption device can be a separate electronic device, for example, or can be a software application installable on a PC or other data processing device. A decryption key is also provided. The decryption key can be a single, unchanging key, or alternatively, the decryption device can be so configured as to be reset from time to time, requiring a different decryption key each time. Such a modifiable decryption key can be provided by the recording producer from time to time in order to provide heightened security against unauthorized viewing.

Embodiments of the inventive apparatus, systems and methods can also be used competitively to produce recordings. In this application, two or more persons view the same event by means of the same apparatus and system. Each person then produces a recording by selecting, assembling and editing various of the recorded feeds from the plurality of cameras, and submits the recording for consideration by a judge. A winning recording is selected from those submitted.

Trailers, motor homes, vans and the like equipped with an apparatus as described herein can be used to produce traveling shows and video productions. Such vehicles can move from location to location, for example from one city or state to another, or to various personal residences in a given city. At each such location, an event such as a modeling show, a sporting event, a video production, etc. can be viewed and/or recorded as described herein. The vehicles themselves can be rented or leased, on a per-use basis or for a specified length of time.

Various embodiments of the inventive apparatus and systems can be incorporated into existing or new commercial establishments. For example, a place of business whose purpose is to provide facilities to the public for production of personalized video recordings can include a number of separate rooms, each equipped with a system as described herein. Members of the public can schedule time in a recording room for production of videos of desired events to take place within the room, and purchase the recordings of the events (as copies or originals).

A bar, nightclub or gentlemen's club, for example, can equip a room therein with an apparatus as described herein in order to stage events for viewing, by patrons of the establishment as well as on-line viewers, and/or recording for sale to event participants, establishment patrons, on-line viewers and/or other members of the public. Exemplary events include dance contests, amateur stripping competitions and other amateur performances, and the like. Users can be charged a premium, for example, or use of the room can be awarded as a prize in a competition. Operators of the establishment can also make use of "shills" to perform, in order to motivate other patrons to participate.

What is claimed is:

1. An apparatus for viewing an event at an event site, the apparatus comprising:
   a) a plurality of cameras disposed about an event site, the cameras providing views of the event site from at least two different camera angles,
   b) a viewer in communication with the plurality of cameras, the viewer enabling a user to selectively view the event by means of at least two of the plurality of cameras,
   c) a support structure for the plurality of cameras, and
   d) at least one further component selected from the group consisting of
      i) a lighting system, wherein the support structure comprises at least one indicium for facilitating attachment of the lighting system to the support structure, and
      ii) a participant communication system, wherein the participant communication system enables the user to provide visual or auditory information to a participant in the event.

2. The apparatus of claim 1 wherein the support structure is a collapsible structure.

3. The apparatus of claim 2 wherein the support structure is an inflatable structure.

4. The apparatus of claim 2 wherein the support structure comprises a collapsible framework comprising a plurality of spars.

5. The apparatus of claim 4 wherein the support structure comprises a plurality of collapsible frameworks which collectively define an at least partially enclosed volume.

6. The apparatus of claim 1 wherein the support structure is secured to at least a portion of an interior volume of a vehicle.

7. The apparatus of claim 1 wherein the support structure is secured to at least a portion of an interior volume of a building.

8. The apparatus of claim 1 comprising a lighting system, wherein the lighting system comprises a plurality of lights.

9. The apparatus of claim 8 wherein the plurality of lights are individually attached to different locations on the support structure.

10. The apparatus of claim 1 wherein the support structure comprises a plurality of indicia for facilitating attachment of the plurality of cameras to the support structure.

11. The apparatus of claim 1 wherein the plurality of cameras comprise cameras having different focuses.

12. The apparatus of claim 1 further comprising an obscured-participant signal.

13. The apparatus of claim 1 wherein the viewer enables the user to view the event site from a viewing location remote from the event site.

14. The apparatus of claim 1 wherein the viewing location is not visible from the event site.

15. A system for viewing an event at an event site, the system comprising:
   i) a central site, and
   ii) an apparatus comprising:
      a) a plurality of cameras disposed about an event site, the cameras providing views of the event site from at least two different camera angles, the cameras providing feeds to the central site,
      b) a viewer in communication with the plurality of cameras, the viewer enabling a user to access the central site and to selectively view the event by means of at least two of the plurality of cameras,
      c) a support structure for the plurality of cameras, and
      d) at least one further component selected from the group consisting of
         i) a lighting system, wherein the support structure comprises at least one indicium for facilitating attachment of the lighting system to the support structure, and
         ii) a participant communication system, wherein the participant communication system enables the user to provide visual or auditory information to a participant in the event.

16. The system of claim 15 wherein the central site is connected to a network.

17. The system of claim 16 wherein the cameras provide the feeds to the central site via the network.

18. A system for recording an event at an event site, the system comprising:
   a) a central site,
   b) a plurality of cameras disposed about an event site, the cameras being in communication with the central site and providing feeds of the event site from at least two different camera angles, c) a viewer in communication with the plurality of cameras, the viewer enabling a user to access the central site and to selectively view the event site by means of at least two of the plurality of cameras,
d) a support structure for the plurality of cameras,
e) at least one further component selected from the group consisting of
  i) a lighting system, wherein the support structure comprises at least one indicium for facilitating attachment of the lighting system to the support structure, and
  ii) a participant communication system, wherein the participant communication system enables the user to provide visual or auditory information to a participant in the event, and
f) a recorder adapted to selectively record the feeds from at least two of the plurality of cameras.

19. The system of claim 18 wherein the central site is connected to a network.

20. The system of claim 19 wherein the cameras provide the feeds to the central site via the network.

21. The system of claim 18 wherein the recorder is operable by the user.

22. A method for producing a recording of an event at an event site, the method comprising the steps of:
a) providing an apparatus for recording the event at the event site, the apparatus comprising:
  i) a plurality of cameras disposed about the event site, the cameras providing feeds of the event site from at least two different camera angles, and
  ii) a recorder in communication with the plurality of cameras, the recorder enabling a user to selectively record the event by means of at least two of the plurality of cameras,
b) selectively recording the feeds from the at least two of the plurality of cameras, the recording being carried out by a recording producer who is not a participant in the event, and
c) providing a copy of the recording produced in step b) to an event participant, the recording being provided to the event participant in encrypted form.

23. The method of claim 22 wherein a plurality of events are recorded, each event taking place at a different event site provided with a separate apparatus.

24. The method of claim 23 wherein recordings of at least two of the plurality of events are at least partially combined.

25. The method of claim 24 wherein portions of recordings of at least two events are combined, whereby an occurrence of the at least two events at substantially the same event site is simulated.

26. The method of claim 22 wherein the recording producer retains possession of the recording produced in step b).

27. The method of claim 22 wherein at least one event participant retains possession of the recording produced in step b).

28. The method of claim 22 wherein a decryption device is provided to the event participant together with the copy of the recording, the copy of the recording being viewable only by use of the decryption device.

29. The method of claim 28 wherein the decryption device requires a decryption key, and wherein the decryption key is provided together with the decryption device.

30. The method of claim 28 wherein the decryption device requires a decryption key, and wherein the decryption key is modifiable by the recording producer and provided to the event participant when modified.

31. The method of claim 22 wherein the event is recorded over a network to which the apparatus is connected.

32. The method of claim 31 wherein the apparatus is connected to a central site over a network, and wherein a user records the event over the network.

33. A recording produced by the method of claim 22.

* * * * *